United States Patent [19]

Nomura

[11] Patent Number: 5,625,770
[45] Date of Patent: Apr. 29, 1997

[54] FILE SYSTEM FOR FILING DOCUMENTS, USING A CATALOG CARD HAVING A PLURALITY OF MARKS THEREON

[75] Inventor: Keiichi Nomura, Kawasaki, Japan

[73] Assignee: Ricoh Company, Ltd., Tokyo, Japan

[21] Appl. No.: 352,435

[22] Filed: Dec. 9, 1994

Related U.S. Application Data

[63] Continuation of Ser. No. 851,875, Mar. 16, 1992, abandoned.

[30] Foreign Application Priority Data

Apr. 20, 1991 [JP] Japan ................................. 3-116821

[51] Int. Cl.⁶ ................................. G06F 15/76
[52] U.S. Cl. ................ 395/761; 358/403; 358/506; 358/535; 382/175; 382/306; 382/312; 395/621; 395/792
[58] Field of Search .............................. 395/600, 148, 395/621, 147, 145; 382/48, 175, 176, 306, 312; 358/506, 535, 403

[56] References Cited

U.S. PATENT DOCUMENTS

| | | | |
|---|---|---|---|
| 4,352,012 | 9/1982 | Verderber et al. ................... | 235/487 |
| 4,589,144 | 5/1986 | Namba .................................. | 382/61 |
| 4,760,606 | 7/1988 | Lesnick et al. ....................... | 382/48 |
| 4,797,946 | 1/1989 | Katsuta et al. ....................... | 382/61 |
| 5,016,114 | 5/1991 | Sakata .................................. | 358/404 |
| 5,038,393 | 8/1991 | Namba .................................. | 382/61 |
| 5,068,888 | 11/1991 | Scherk ................................. | 379/100 |
| 5,081,688 | 1/1992 | Sakuragi .............................. | 382/11 |
| 5,179,649 | 1/1993 | Masuzaki et al. ................... | 395/148 |
| 5,231,663 | 7/1993 | Earl ..................................... | 380/18 |
| 5,247,591 | 9/1993 | Baran ................................... | 382/61 |
| 5,274,468 | 12/1993 | Ojha .................................... | 358/448 |
| 5,282,052 | 1/1994 | Johnson et al. ..................... | 358/402 |
| 5,363,214 | 11/1994 | Johnson ............................... | 358/462 |
| 5,438,426 | 8/1995 | Miake et al. ........................ | 358/403 |
| 5,448,375 | 9/1995 | Cooper et al. ...................... | 358/403 |
| 5,465,167 | 11/1995 | Cooper et al. ...................... | 358/468 |
| 5,479,269 | 12/1995 | Bronnenberg et al. .............. | 358/403 |

*Primary Examiner*—Thomas G. Black
*Assistant Examiner*—Jean R. Homere
*Attorney, Agent, or Firm*—Lowe, Price, LeBlanc & Becker

[57] ABSTRACT

A catalogue card and a document card are used for a file system. The document card indicates a predetermined document. The catalogue card indicates a catalogue of the document. Since the catalogue of the document is input to the file system via the catalogue card instead of a keyboard, a user who is not used to operating a keyboard can easily input the catalogue and manage the document.

11 Claims, 13 Drawing Sheets

FILE SYSTEM FOR FILING DOCUMENTS, USING A CATALOG CARD HAVING A PLURALITY OF MARKS THEREON

This is a continuation of U.S. patent application Ser. No. 07/851,875, filed Mar. 16, 1992, now abandoned.

BACKGROUND OF THE INVENTION

The present invention relates generally to file systems, and more particularly to a file system in which file management is performed via a mark sheet instead of a keyboard.

In a conventional electronic file system, each document to be filed is scanned and stored as image data in a file medium, such as an optical disk, in the file system. Then an operator registers a catalogue data: such as a file name, a file attribute, and file directory, etc., for each document, in the file system, via a keyboard, in order to manage the file. However, a user who is not used to operating a keyboard often tends to avoid using the keyboard, and thus the useful electronic file system is seldom used.

SUMMARY OF THE INVENTION

Accordingly, it is a general object of the present invention to provide a novel and useful file system in which the above disadvantage is eliminated.

Another more specific object of the present invention is to provide a file system by which a user who is not used to operating a keyboard can easily produce and manage a file.

According to one feature of the present invention a file system for filing a document written on a document card by using a catalogue card including a plurality of marks which define a catalogue of the document, comprises image reading means for scanning the catalogue card and the document card to generate image data corresponding to the same, processing means, coupled to the image reading means, for detecting a mark drawn on the catalogue card based on the image data generated by the image reading means, and for generating code data corresponding to the mark drawn, indicator means, coupled to the image reading means and processing means, for indicating the image data and the code data, so that the document is correlated with the catalogue thereof, and memory means, coupled to the image reading means, processing means and indicator means, for storing the image data and the code data.

According to another feature of the present invention, a catalogue card indicating a catalogue of a document to be filed, the document being written on a document card, comprises an identification mark different from that of the document card, and a plurality of marks for defining the document, wherein the catalogue card and the document card are used for a file system including image reading means for scanning the catalogue card and the document card to generate image data corresponding to the same, processing means, coupled to the image reading means, for detecting a mark drawn on the catalogue card by means of the image data generated by the image reading means, and for generating code data corresponding to the mark drawn, indicator means, coupled to the image reading means and processing means, for indicating the image data and the code data, so that the document is correlated with the catalogue thereof, and memory means, coupled to the image reading means, processing means and indicator means, for storing the image data and the code data. Incidentally, the catalogue card may indicate catalogues of a plurality of documents.

According to the present invention, since the catalogue is registered via the catalogue card instead of a keyboard, a user who is not used to operating a keyboard can easily manage the documents.

Other objects and further features of the present invention will become apparent from the following detailed description when read in conjunction with the accompanying drawings.

DETAILED DESCRIPTION OF THE PREFERRED EMBODIMENTS

Figure 1:
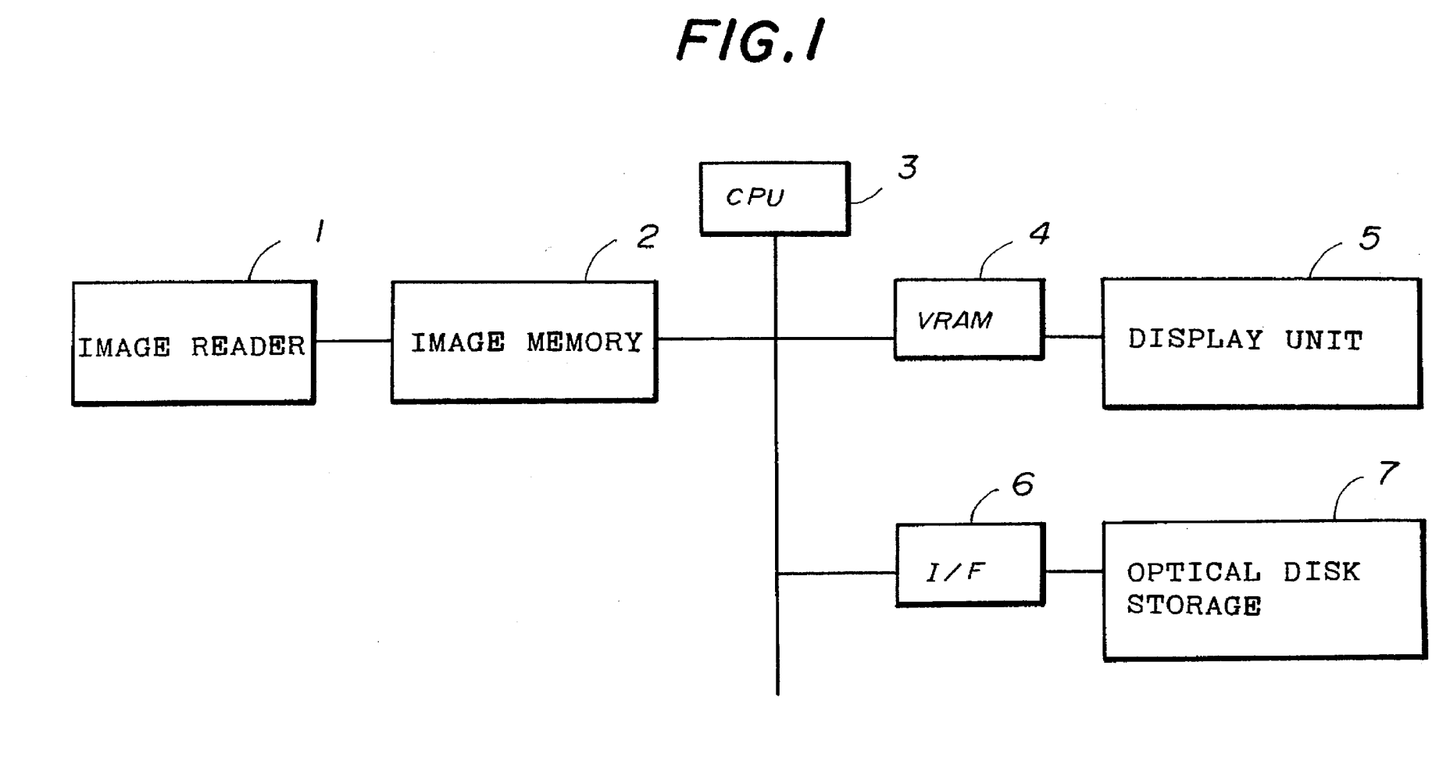
FIG.1 shows an essential block diagram of a file system according to the present invention.

A file system according to the present invention comprises, as shown in FIG.1, an image reader 1, an image memory 2, a central processing unit (abbreviated CPU hereinafter) 3, a video RAM (abbreviated VRAM hereinafter) 4, a display unit 5, an interface (abbreviated I/F hereinafter) 6, and an optical disk storage 7. They are connected to each other as shown in FIG.1.

The image reader 1 comprises a scanner for scanning an image on a catalogue card or a document card to generate image data. The catalogue card and the document card will be described later. The image reader 1 functions as an autodocument feeder, and thus a document card is automatically fed to be scanned.

The image memory 2 temporarily stores therein the image data generated by the image reader 1.

The CPU 3 controls each part of the file system and operates in accordance with a flowchart shown in FIG.13, which will be described later. In addition, the CPU 3 includes a data processor which detects the existence and position of a mark drawn on the catalogue card by means of detecting a run length of a black picture element (abbreviated pixel hereinafter). The existence and position of the drawn mark is expressed as code data.

The display unit 5 comprising a cathode ray tube (abbreviated CRT hereinafter) displays the image data stored in the image memory 2 via characters, figures and colors stored in the VRAM 4.

The optical disk storage 7 includes an optical disk as a file medium which stores image data and code data, and a recording/reproducing device for recording image data and code data on the optical disk and for reproducing the image data and code data therefrom. The image data is transmitted to the optical disk storage 7 via the I/F 6.

Figure 3:
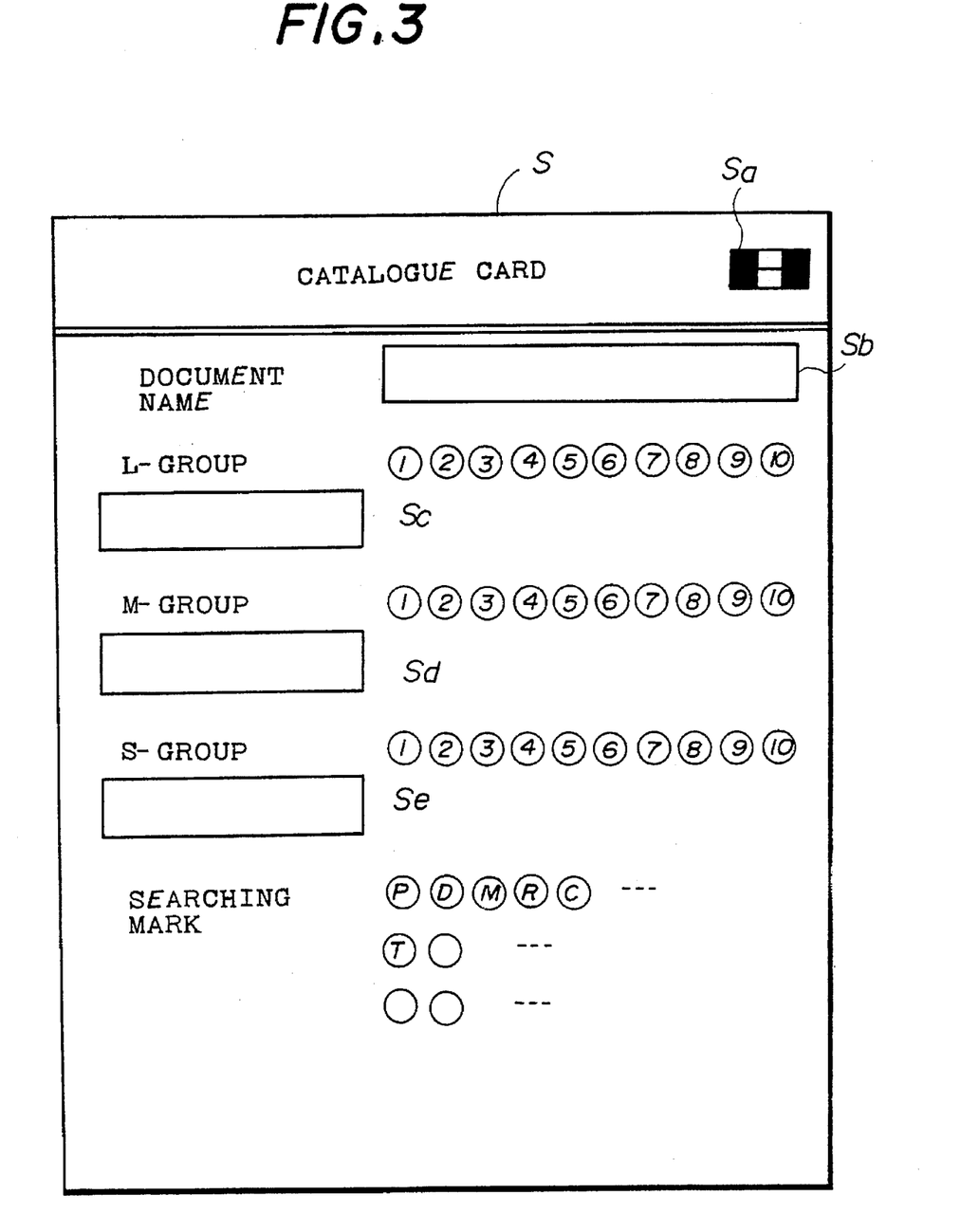
FIG.3 shows one example of the catalogue card shown in FIG.2.

A description will now be given of the catalogue card and the document card with reference to FIGS though 9. According to the present invention, catalogue data for each document is input via a catalogue card instead of the keyboard. Since the catalogue card comprises, as shown in FIG.3, a mark sheet, an operator of the file system can easily input the catalogue data to the file system without operating a keyboard. Thus, even a user who is not used to operating the keyboard can use the file system.

Figure 2:
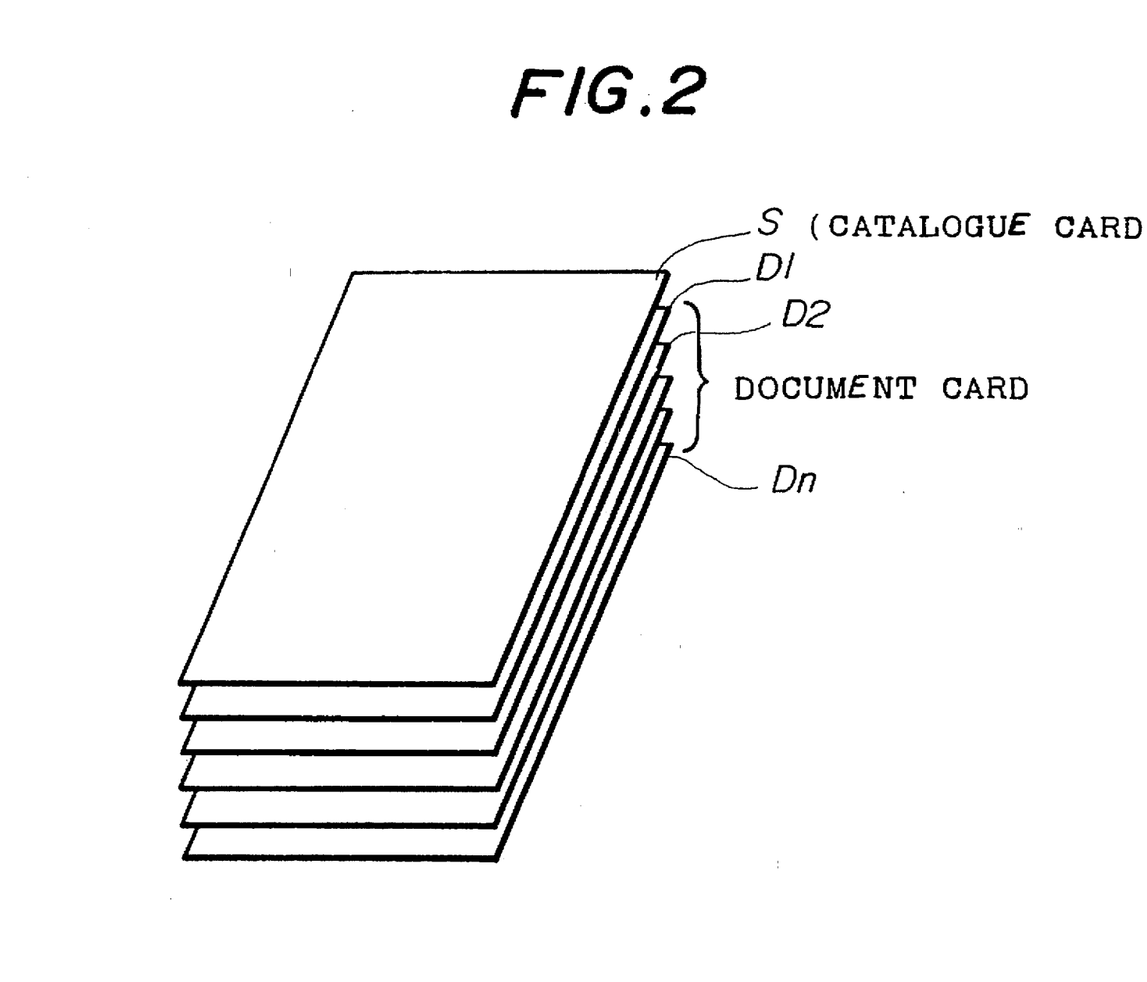
FIG.2 shows a catalogue card and document cards used for the file system shown in FIG.1.

The catalogue card (S) is piled on the top of a plurality of document cards (D1, D2, . . . , Dn), as shown in FIG.2, when the cards are scanned by the image reader 1 shown in FIG.1, so that the image reader 1 reads in order, from the catalogue card (S) to the document card (Dn). The documents cards (D1, D2, . . . , Dn) as a whole represent one document.

Figure 5:
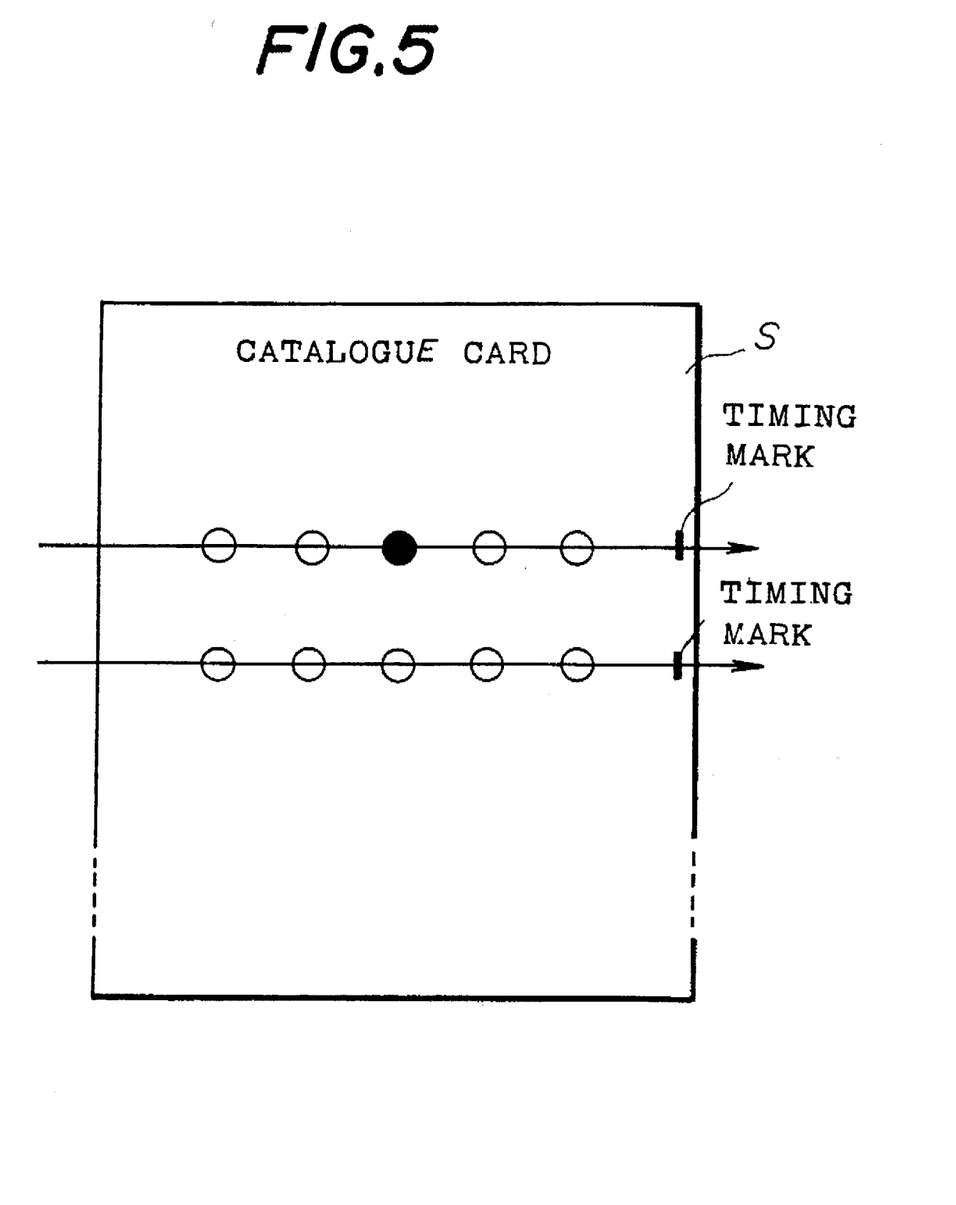
FIG.5 shows an operation of an optical mark reader of the file system shown in FIG.1.

The catalogue card (S), used for a catalogue of each document, comprises, as shown in FIG.3, items of a card identification (abbreviated card ID hereinafter) (Sa), a document name (Sb), a large group (abbreviated L-group hereinafter) (Sc), a middle group (abbreviated M-group hereinafter) (Sd), a small group (abbreviated S-group hereinafter) (Se) and searching marks. The card ID (Sa) comprises a 2*3 matrix pattern and represents a file identification of the document. The matrix pattern is converted into code data by the data processor in the CPU 3. The document name (Sb) represents a file name of the document. Since the document name (Sb) is handwritten by the operator, it is stored as image data. Each of the L-group (Sc), M-group (Sd) and s-group (Se) represents a file directory and a file group. A predetermined character or symbol may be handwritten by the operator on each blank of each of the L-group (Sc), M-group (Sd), and S-group (Se). In addition, each group has marks having numerals 1 to 10 to be drawn by the operator. The searching marks represent file classes, such as "P (Plan)", "D (Design)", "M (Marketing)", "R (Research)", "C (Cooperation)", and "T (Transmission)". The operator may mark an arbitrary searching mark. The drawn mark of each group and the drawn searching mark is converted into code data by the data processor in the CPU 3. Each mark is drawn by a drop-out color. Incidentally, the catalogue card (S) may include timing marks to precisely recognize each mark, as shown in FIG.5.

Figure 4:
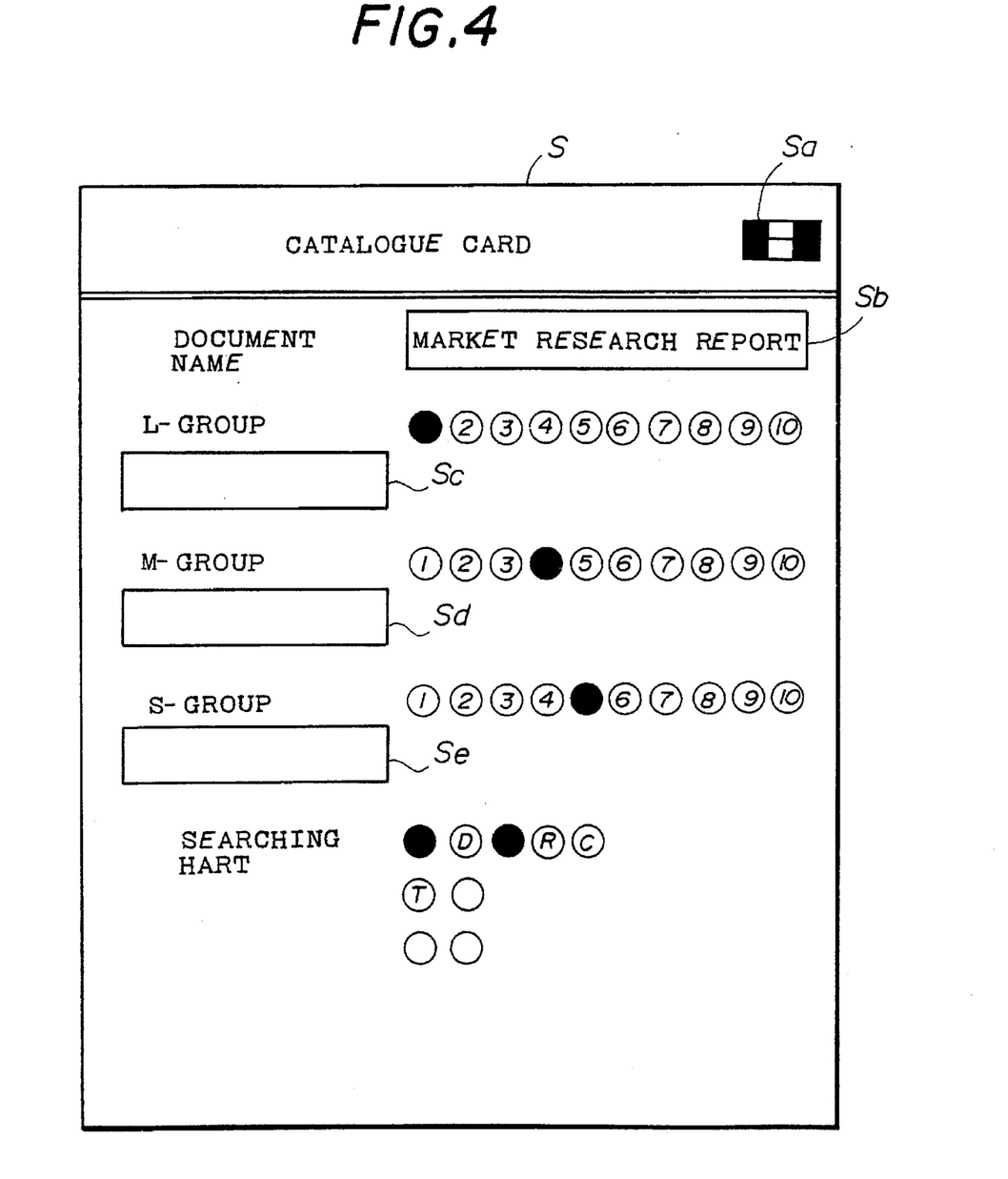
FIG.4 shows one example of the catalogue card shown in FIG.2 which is filled out.

The catalogue card (S) may be filled out as shown in FIG.4. That is, the document name (Sb) is "MARKET RESEARCH REPORT". Each group still has a blank, but the numeral 1 of the L-group (Sc), the numeral 4 of the M-group (Sd), and the numeral 5 of the S-group (Se) are drawn. In addition, the searching marks "P" and "M" are drawn.

Figure 6:
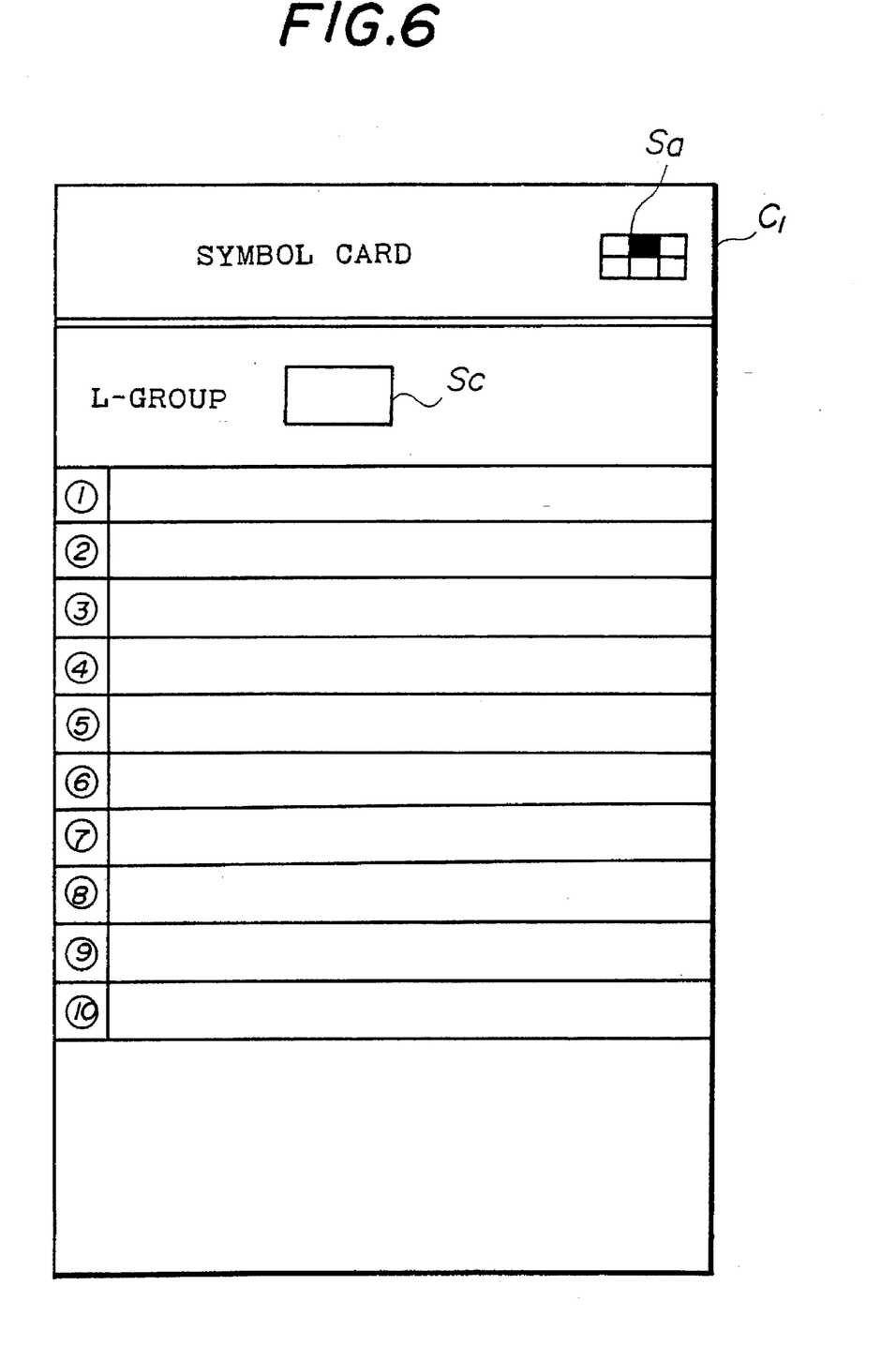
FIG.6 shows one example of a symbol card of the catalogue card shown in FIG.4.
Figure 7:
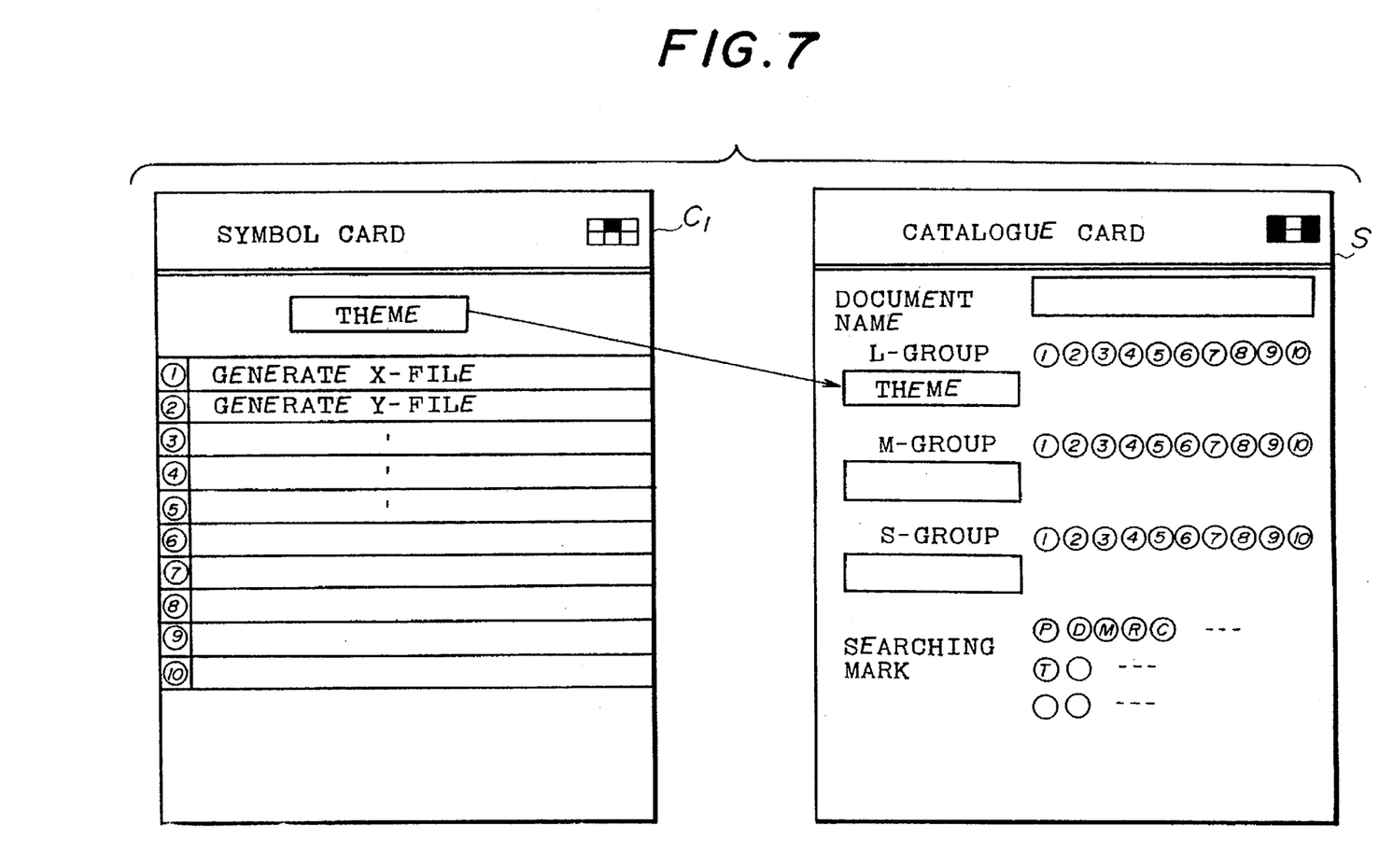
FIG.7 shows a relationship between the catalogue card and the symbol card shown in FIG.6.

A symbol card ($C_1$) shown in FIG.6 is used when a predetermined character or symbol is handwritten on the blank of the L-group. A similar symbol card is prepared for the M-group and S-group. By using the symbol card ($C_1$), each document is classified in detail, for instance, hierarchically, and it can thus be easily searched. The symbol mark ($C_1$) comprises, as shown in FIG.6, a card ID (Sa) and blank (Sc). FIG.7 shows a relationship between the catalogue card (S) and the symbol card ($C_1$).

Figure 8:
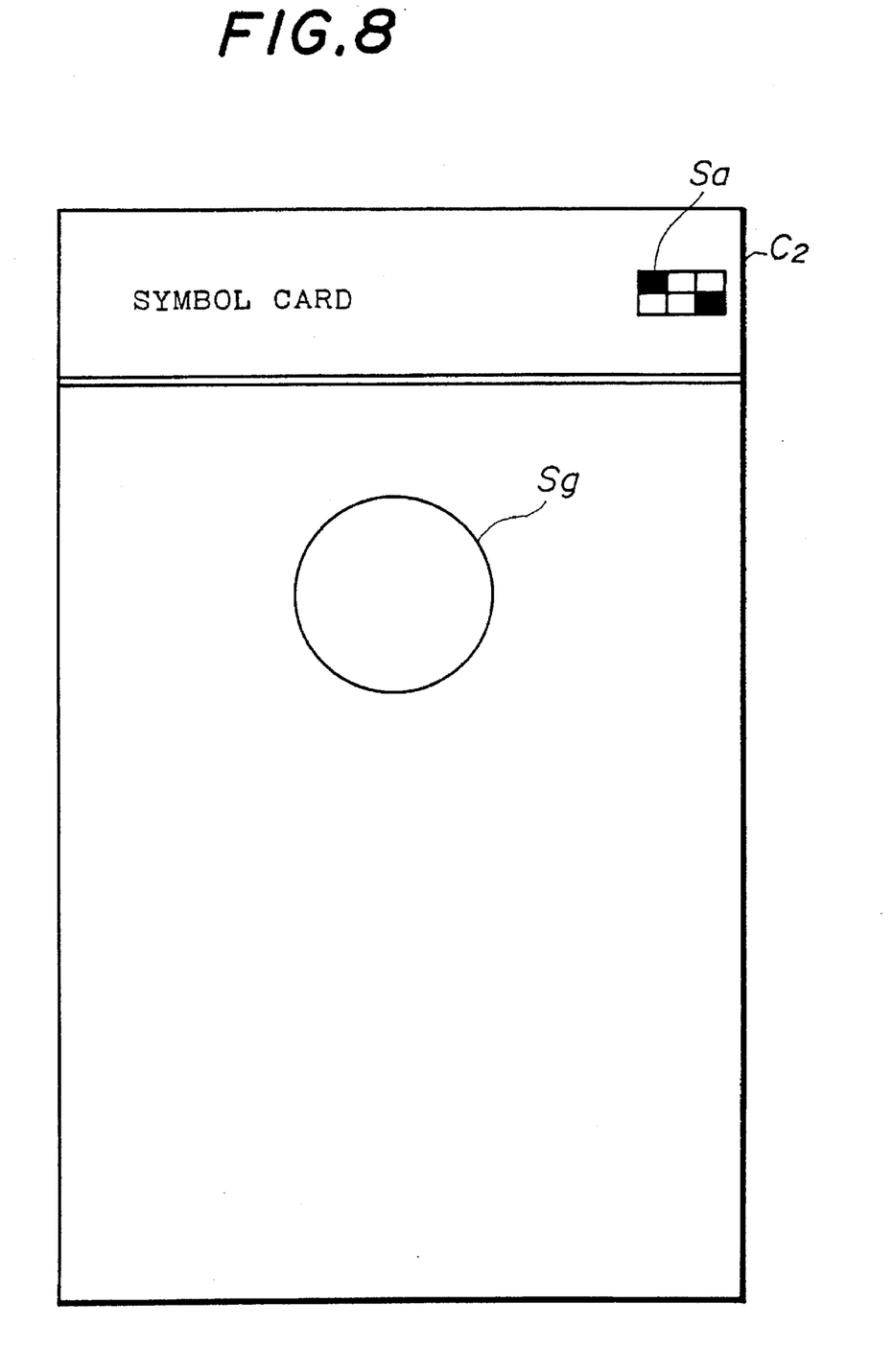
FIG.8 shows another symbol card of the catalogue card.
Figure 9:
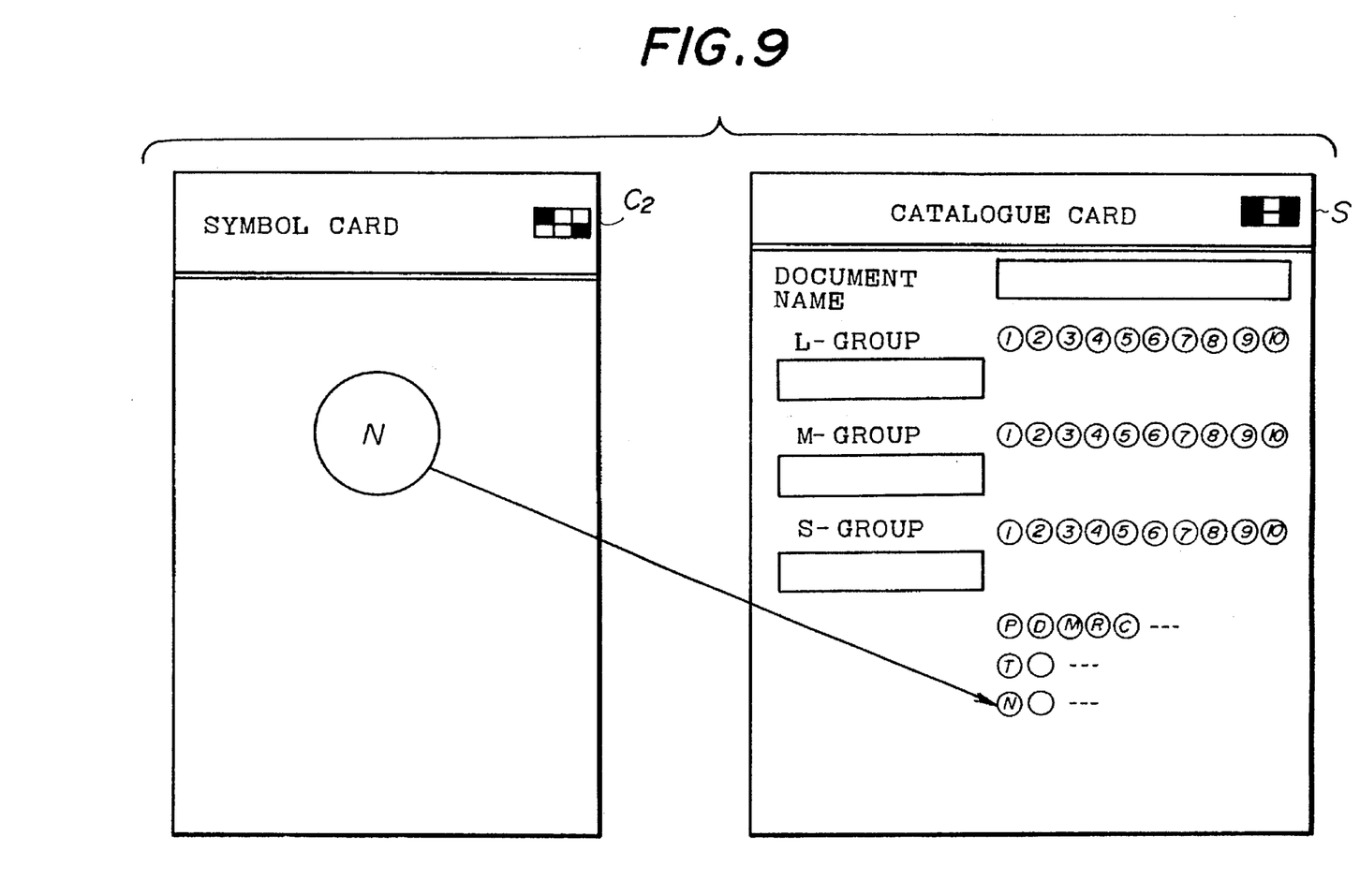
FIG.9 shows a relationship between the catalogue card and the symbol card shown in FIG.8.

A symbol card ($C^2$) shown in FIG.8 is used when a new searching mark is registered in the catalogue card (S) or a searching mark on the catalogue card (S) is changed. FIG.9 shows a relationship between the catalogue card (S) and the symbol card ($C_2$). In FIG.9, when a new searching mark "N (New)" is handwritten in a space (Sg) on the symbol card shown in FIG.8, "N" is allotted to one of the searching marks on the catalogue card (S).

Figure 10:
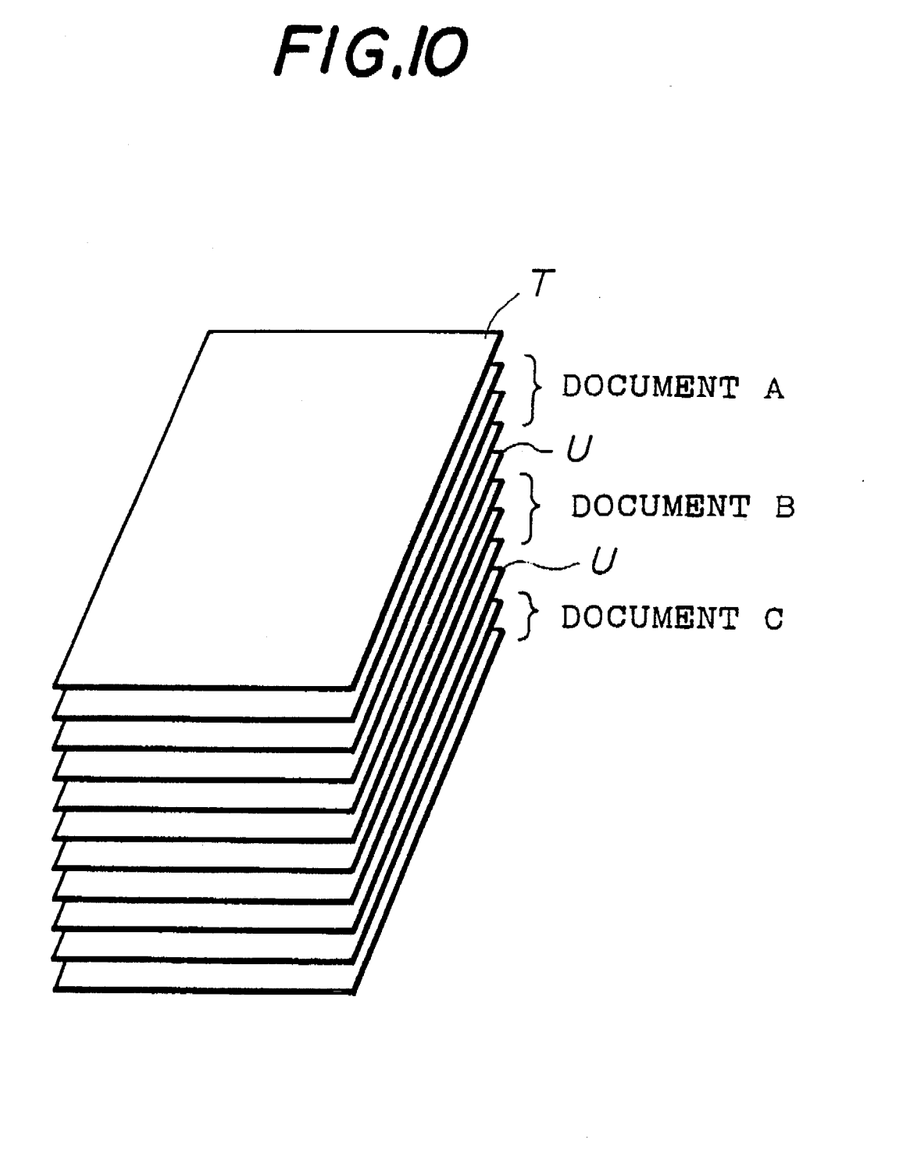
FIG.10 shows another catalogue card and a plurality of documents used for the file system shown in FIG.1.
Figure 11:
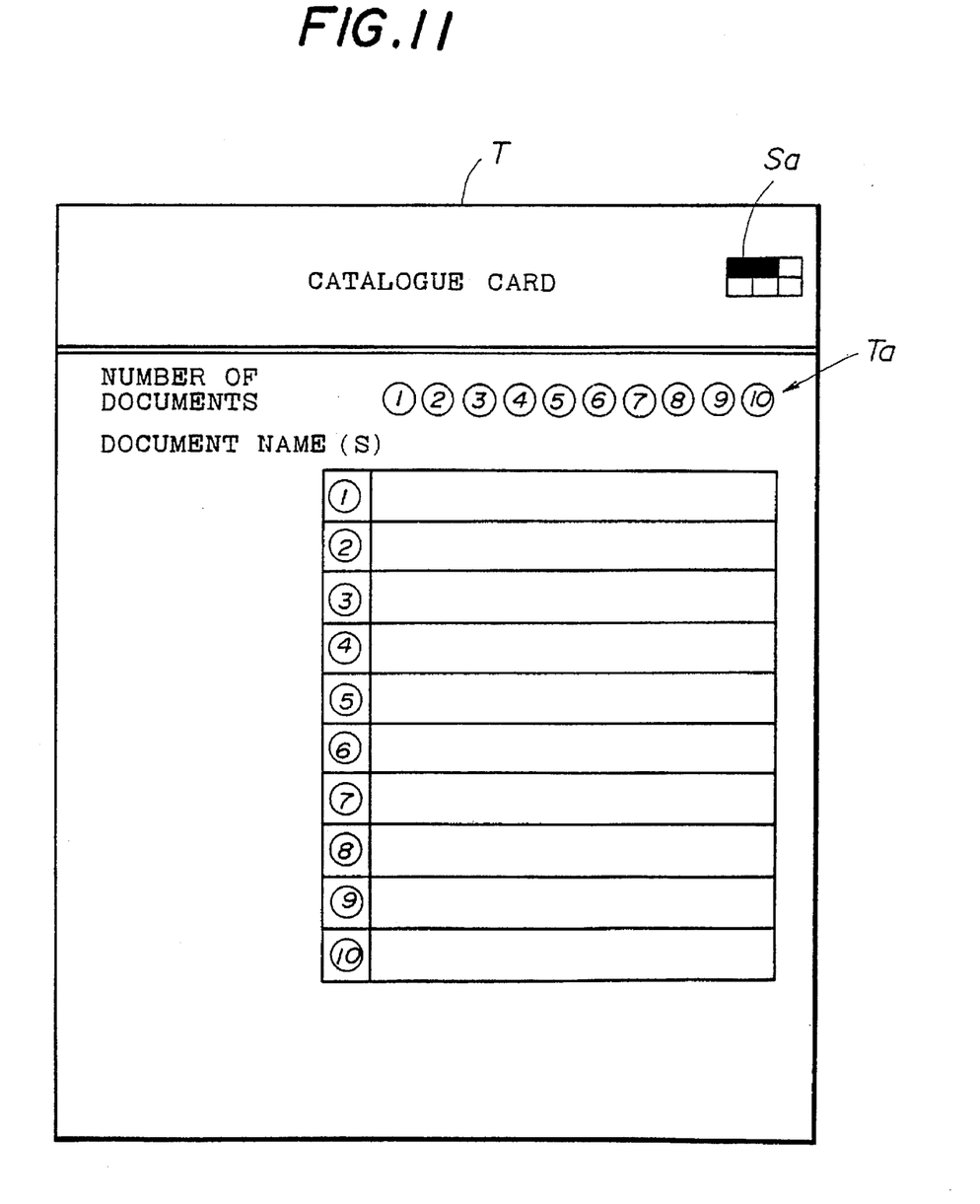
FIG.11 shows one example of the catalogue card shown in FIG.10.
Figure 12:
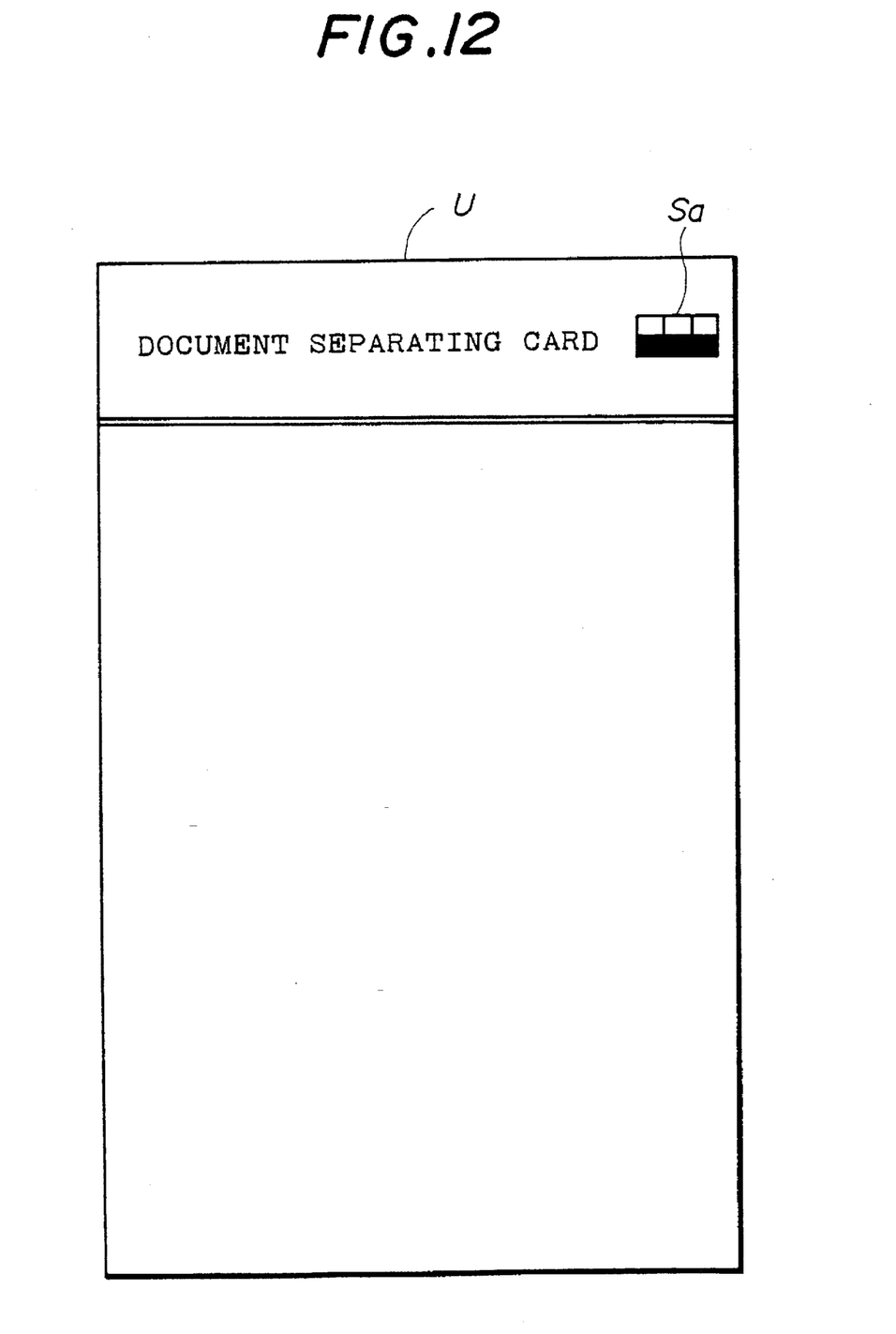
FIG.12 shows a document separating card shown in FIG.10.

According to the present invention, a plurality of documents can be registered in one catalogue card. In FIG.10, a catalogue card (T) serves as a plurality of catalogue cards (S) shown in FIG.3. In addition, a document separating card (U) shown in FIG.12 is used. A plurality of documents A to C are separated from each other by the document separating cards (U) and the catalogue card (T) is piled on the top of the document A, when they are scanned by the image reader 1 shown in FIG.1. The catalogue card (T) has marks (Ta) having numerals 1 to 10 representing the number of documents. Thus, ten documents can be registered in a lump. The mark (Ta) is converted into code data. In addition, if the document names are handwritten, they are stored as image data. Since the document separating card (U) merely separates two documents, nothing is written thereon.

Figure 13:
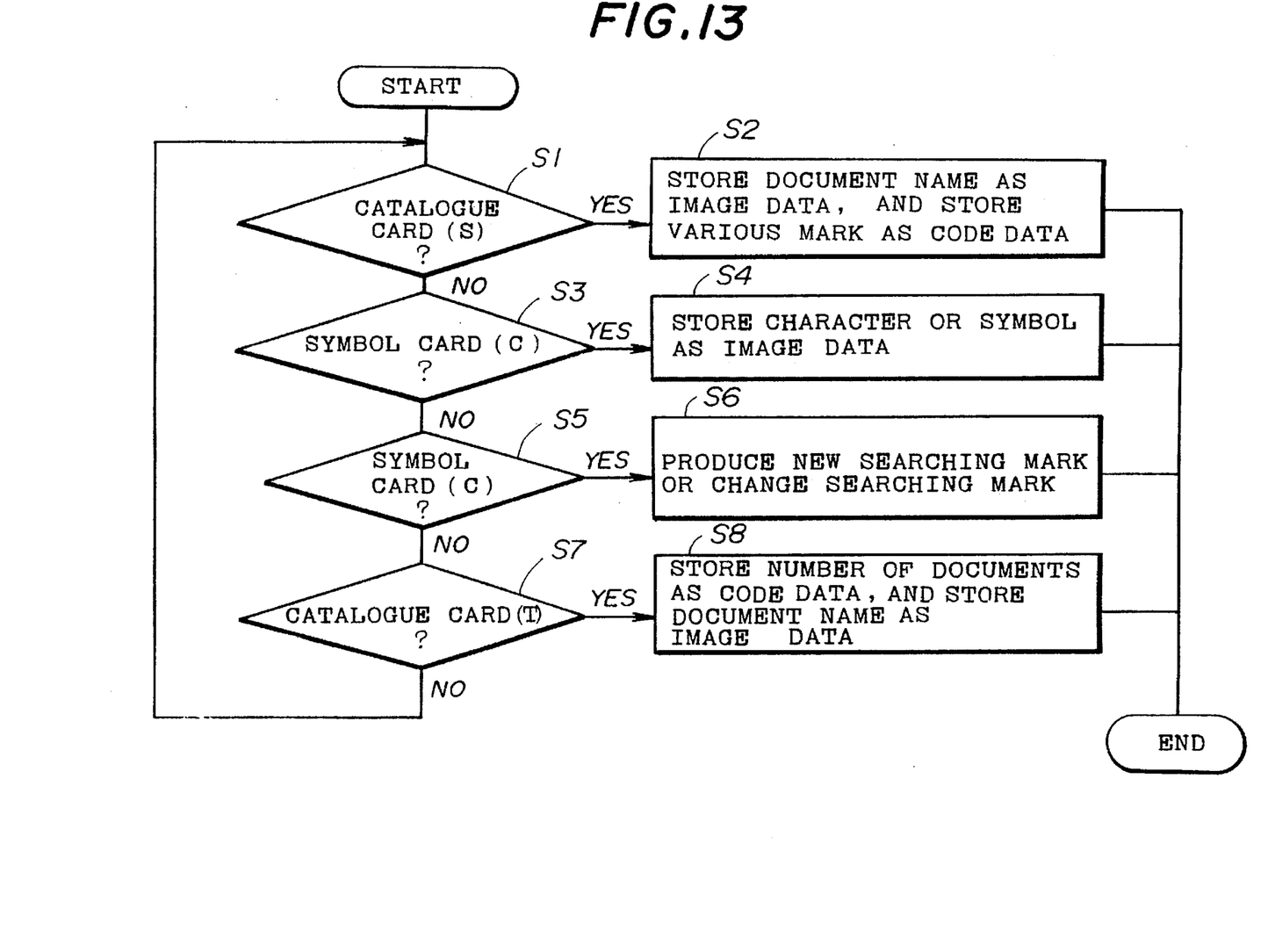
FIG.13 shows a flowchart executed by a central processing unit of the file system shown in FIG.1.

FIG.13 shows a flowchart executed by the CPU 3 shown in FIG.1. The CPU 3 first judges the kind of a card, by means of the card ID (Sa). If the file system receives a catalogue card (S) shown in FIG.3 (in step S1), a document name (Sb) is stored as image data, whereas various marks are stored as code data (in step S2). The catalogue card (S) is stored with the document cards (D1 to Dn). If the file system receives a symbol card ($C_1$) shown in FIG.6 (in step S3), a character or a symbol in each group (Sc, Sd, and Se) is stored as image data. If the file system receives a symbol card ($C_2$) shown in FIG.8 (in step S5), a new searching mark is produced or a predetermined searching mark is changed (in step S6). If the file system receives a catalogue card (T) shown in FIG.10 (in step S7), a number of documents is stored as code data and the document names are stored as image data (in step S8). The catalogue card (T) is stored with the document card of a plurality of documents (A, B, and C, etc.)The CPU wait's one of the catalogue card (s), catalogue card (T) symbol card ($C_1$) and symbol card ($C_2$) (a loop of the cascade steps S1, S3, S5 and S7). After one of the steps S2, S4, S6 and S8, the procedure of the CPU 3 is terminated.

Thus, in summary, an operator of the file system can easily input catalogue data of documents since he/she uses a mark card instead of a keyboard. Each document is classified in detail if the symbol cards ($C_1$) and ($C_2$) are used. In addition, a plurality of documents can be registered.

Incidentally, the present invention is applicable to a file system compatible with a keyboard.

Further, the present invention is not limited to these preferred embodiments, as various variations and modifications may be made without departing from the scope of the present invention.

What is claimed is:

1. An electronic file system for filing a document on a document card by using a catalog card mark sheet including a plurality of graphical marks having predetermined geometric shape which define a catalog of the document, said electronic file system comprising:

a) image reading means for scanning the catalog card mark sheet and the document card to generate image data including:

1) first image data corresponding to the catalog card mark sheet and including title image data representing either or both of (i) a document name and (ii) information related to the document name; and 2) second image data corresponding to the document card;

b) processing means, coupled to said image reading means and including:
1) means for detecting a graphical mark having a predetermined geometric shape drawn on the catalog card mark sheet, the detecting being based on the first image data generated by said image reading means,
2) means for generating code data corresponding to the first image data representing the graphical mark drawn on the catalog card mark sheet;

c) indicator means, coupled to said image reading means and processing means, for indicating the image data and the code data so as to correlate the document with the catalog thereof and for performing file management on the basis of said code data corresponding to the first image data representing the graphical mark drawn on the catalog card mark sheet; and d) memory means, coupled to said image reading means, processing means and indicator means, for storing:
1) the image data including the first image data corresponding to the catalog card; and
2) the code data which was generated in correspondence to the first image data representing the graphical mark drawn on the catalog card mark sheet.

2. An electronic file system according to claim 1, wherein said image reading means includes:
means for scanning a first symbol card and for generating image data corresponding to an index of the document and catalog thereof if the first symbol card indicating the index of the document is used with the catalog card mark sheet, so that the index of the document is added to the catalog.

3. An electronic file system according to claim 2, wherein said processing means includes:
means for establishing a graphical mark having a predetermined geometric shape as a new mark on the catalog card mark sheet, if a second symbol card designating the graphical mark is used with the catalog card mark sheet.

4. An electronic file system according to claim 3, wherein:
the second symbol card has a matrix pattern different from that of the catalog card mark sheet, and
said processing means recognizes the second symbol card based on the matrix pattern thereof.

5. An electronic file system according to claim 2, wherein:
the first symbol card has a matrix pattern different from that of the catalog card mark sheet, and
said processing means recognizes the first symbol card based on the matrix pattern thereof.

6. An electronic file system according to claim 1, wherein:
the catalog card mark sheet has a matrix pattern different from that of the document card, and
said processing means recognizes the catalog card mark sheet based on the matrix pattern thereof.

7. An electronic file system according to claim 1, wherein:
the image data generated by said image reading means is expressed by white pixels and black pixels; and
said processing means includes means for using a run length of black pixels to detect the graphical mark having a predetermined geometric shape drawn on the catalog card mark sheet.

8. A catalog card mark sheet indicating a catalog of a document to be filed, the document being written on a document card, said catalog card mark sheet comprising:

a) a matrix pattern different from that of the document card; and
b) a plurality of graphical marks having a predetermined geometric share for defining the document;
wherein said catalog card mark sheet and the document card are used for an electronic file system including:
1) image reading means for scanning the catalog card mark sheet and the document card to generate image data including:
   A) first image data corresponding to the catalog card mark sheet and including title image data representing either or both of (i) a document name and (ii) information related to the document name; and
   B) second image data corresponding to the document card;
2) processing means, coupled to the image reading means, including:
   i) means for detecting a graphical mark having a predetermined geometric shape drawn on the catalog card mark sheet by means of the first image data generated by the image reading means, the mark drawn constituting either the matrix pattern or one of the plurality of graphical marks for defining the document; and
   ii) means for generating code data corresponding to the first image data representing the graphical mark drawn on the catalog card mark sheet;
3) indicator means, coupled to the image reading means and processing means, for indicating the image data and the code data so as to correlate the document with the catalog thereof and for performing file management on the basis of said code data corresponding to the first image data representing the graphical mark drawn on the catalog card mark sheet; and
4) memory means, coupled to the image reading means, processing means and indicator means, for storing:
   i) the image data including the first image data corresponding to the catalog card mark sheet; and
   ii) the code data which was generated in correspondence to the first image data representing the graphical mark drawn on the catalog card mark sheet.

9. A catalog card mark sheet according to claim 8, wherein said plurality of graphical marks represent a file directory and a file group of said document.

10. A catalog card mark sheet according to claim 8, wherein said plurality of graphical marks include searching marks used to retrieve said document in an electronic file system.

11. A catalog card mark sheet indicating catalogs of a plurality of documents to be filed, each of the documents being written on a document card, said catalog card mark sheet comprising:

a) a matrix pattern different from that of the document card;
b) a plurality of graphical marks having a predetermined geometric shape for defining a number of documents; and
c) a list of names of the documents;
wherein said catalog card mark sheet and the document card are used for an electronic file system including:
1) image reading means for scanning the catalog card mark sheet and the document card to generate image data including:
   A) first image data corresponding to the catalog card mark sheet and including title image data representing either or both of (i) a document name and (ii) information related to the document name; and B) second image data corresponding to the document card;

2) processing means, coupled to the image reading means, including:
   i) means for detecting a graphical mark having a predetermined geometric shape drawn on the catalog card mark sheet by means of the first image data generated by the image reading means, the mark drawn constituting either the matrix pattern or one of the plurality of graphical marks for defining the number of documents; and
   ii) means for generating code data corresponding to the first image data representing the graphical mark drawn on the catalog card mark sheet;

3) indicator means, coupled to the image reading means and processing means, for indicating the image data and the code data so as to correlate each of the documents with a corresponding one of the catalogs and for performing file management on the basis of said code data corresponding to the first image data representing the graphical mark drawn on the cataloq card mark sheet; and 4) memory, means, coupled to the image reading means, processing means and indicator means, for storing:
   i) the image data including the first image data corresponding to the catalog card mark sheet; and
   ii) the code data which was generated in correspondence to the first image data representing the graphical mark drawn on the catalog card mark sheet.

* * * * *